United States Patent [19]

Gillard

[11] Patent Number: 5,562,561
[45] Date of Patent: Oct. 8, 1996

[54] DRIVE AXLE FOR MOTOR VEHICLE

[75] Inventor: Donald Gillard, Despatch, South Africa

[73] Assignee: Gearmax (Proprietary) Limited, Uitenhage, South Africa

[21] Appl. No.: 345,576

[22] Filed: Nov. 28, 1994

[30] Foreign Application Priority Data

Nov. 29, 1993 [ZA] South Africa .................. 93/8912

[51] Int. Cl.⁶ ............................................. F16H 48/30
[52] U.S. Cl. ........................................... 475/231
[58] Field of Search ............................. 475/231

[56] References Cited

U.S. PATENT DOCUMENTS

| | | | |
|---|---|---|---|
| 1,161,057 | 11/1915 | Long | 475/231 |
| 1,888,884 | 11/1932 | Omer et al. | 475/231 |
| 1,955,103 | 4/1934 | Snow et al. | 475/231 |
| 3,107,763 | 10/1963 | Hill | 475/231 |
| 4,703,671 | 11/1987 | Jikihara | 475/231 |
| 5,036,940 | 8/1991 | Takemura | 475/231 |
| 5,133,696 | 7/1992 | Kobayashi | 475/231 |
| 5,342,255 | 8/1994 | Slesinki et al. | 475/231 |

Primary Examiner—Dirk Wright
Attorney, Agent, or Firm—Ladas & Parry

[57] ABSTRACT

A differential gear has a locking ring which is axially displaceable along an axis between a locked position in which it interlocks a dish (serving as a carrier) and a bevel gear, and an unlocked position in which the bevel gear is released. The ring is displaced by pivoting a yoke about an offset, upright pin. Pivoting the yoke is by means of a diaphragm connected via a pin to the yoke. The diaphragm is selectively subjected to vacuum. The diaphragm is attached to a cover of a housing of the differential gear.

7 Claims, 3 Drawing Sheets

DRIVE AXLE FOR MOTOR VEHICLE

This invention relates to a drive axle for a motor vehicle. It relates more specifically to differential gear locking means and to a kit for converting a differential gear.

In a steerable vehicle having drive wheels at ends of a drive axle or axle system, a reduction gear set and a differential gear train are required to transmit torque from a single propeller shaft via a pair of half shafts to the drive wheels at appropriate relative rotation speeds. When driving straight, at no slip, the rotation speeds of the wheels are equal (assuming that the rolling circumferences of the wheels are equal). When driving along a curved path, the outside wheel travels further than the inside wheel and thus has to rotate correspondingly faster to prevent slip. The differential gear train automatically adjusts the relative speeds to make provision for the above requirement.

The kind of differential gear train, which is most commonly in use and to which this invention relates, transmits equal torque to both driving wheels. Thus if one driving wheel loses traction, the half shaft connecting this wheel to the differential gear train will transmit correspondingly lower torque. This lower torque is then also transmitted by the opposite half shaft resulting in correspondingly reduced tractive effort produced by the opposite wheel. The vehicle as a whole is then effectively not driven sufficiently to overcome resistance to motion.

To prevent such an undesirable situation from occurring, differential action of the differential gear train can selectively be locked or prevented, thus ensuring that both wheels are driven at the same speed. Should one wheel then lose traction, the other wheel would still be driven.

This invention thus relates to the field of a differential gear which generally comprises a crown wheel which has bevel cogs, which is arranged for rotation about a transverse crown wheel axis, and which is in use in meshing arrangement with a complemental bevel pinion at an end of a longitudinal propeller shaft transmitting drive from an engine into the differential gear;

a carrier which is fixed to the crown wheel to be rotatable therewith and which mounts a differential gear train which includes at least one bevel pinion add preferably a pair of bevel pinions mounted on the carrier about a pinion shaft defining a bevel pinion axis perpendicular to the crown wheel axis, such that the bevel pinions can orbit about the crown wheel axis and can rotate about the bevel pinion axis;

a pair of bevel gears at inner ends of half shafts, the bevel gears being in opposed arrangement about the crown wheel axis and respectively being in meshing arrangement with the bevel pinions.

In use, during straight travel, the bevel pinions orbit without rotation, and the bevel gears thus rotate in unison with the crown wheel and carrier. When driving along a curved path, the bevel pinions rotate as well, and the bevel gears (and together with them the half shafts and wheels) rotate respectively at faster and correspondingly slower speeds.

In accordance with a first aspect of this invention, there is provided differential gear locking means suitable for use with a differential gear of the general kind described, the differential gear locking means including a locking member which is displaceable between an engaged position in which it interlocks predetermined rotation components of the differential gear, and a disengaged position in which said predetermined rotation components are free for relative rotation;

displacement means for selectively displacing the locking member between said engaged and disengaged positions, the displacement means including a differential pressure device adapted to generate motion when subjected to differential pressure in use and transmission means for operatively transmitting motion of the differential pressure device to the locking member in use, in which the differential gear has a cover for covering a housing thereof, the differential pressure device being attached to, or mounted on or within said cover.

The predetermined rotation components will be components which are irrotational when the bevel pinions are merely orbiting and not rotating, and which do rotate relative to each other when the bevel pinions are rotating. Such predetermined rotation components may, for example, be a bevel gear at an inner end of the half shaft and the carrier.

In a preferred embodiment, the differential pressure device may be in the form of a diaphragm. The cover may define a socket forming a pressure chamber, the diaphragm being exposed at a first side thereof to the pressure chamber. A second side opposite said first side of the diaphragm may be exposed to an internal side of the cover to be exposed in use to an interior of the housing, the diaphragm being adapted to perform also a sealing function for the interior of the housing. The diaphragm will then be compatible with lubricant used within the housing, will be resistant to temperatures which the lubricant may assume, and will be resistant to pressure differentials which may be encountered.

The differential gear locking means may include a pressure conduit arranged to communicate said pressure chamber with pressure differential means and a valve in said pressure conduit which valve can selectively be opened or closed to change the pressure in the pressure chamber in use. The valve may be a solenoid operable valve.

The differential gear locking means may be arranged to cause displacement of the locking member into said engaged position when the diaphragm moves toward or into the pressure chamber. The differential pressure means may then be in the form of a vacuum sink, e.g. an inlet manifold of an engine of a vehicle.

Advantageously, the differential gear locking means may include bias means resiliently biasing the locking member to said disengaged position. The bias means may be in the form of a spring.

By way of development, the differential gear locking means may include in the pressure chamber a switch responsive to motion of the diaphragm into or toward the pressure chamber to make or break an electrical circuit. The electrical circuit may be arranged to actuate a signal, e.g. a confirmation light, when the locking means is operative or engaged.

The invention extends in terms of a second aspect of this invention to a kit for converting a differential gear having a housing and a cover for the housing into a lockable differential gear, the kit including predetermined replacement rotation components for the differential gear having formations to facilitate interlocking;

a locking member adapted selectively to engage said formations of the replacement rotation components to interlock them in use thereby to lock the differential gear;

displacement means for selectively displacing the locking member between an engaged position in which it interlocks the replacement rotation components and a disengaged position in which the replacement rotation components are free for relative rotation, the displacement means including a differential pressure device adapted to generate motion when subjected to differential pressure in use and transmission means for operatively transmitting motion of the differential pressure device to the locking member in use; and a replacement cover to replace said cover for the housing, which replacement cover mounts the displacement means.

The invention is now described by way of example with reference to the accompanying diagrammatic drawings.

In the drawings

Figure 1:
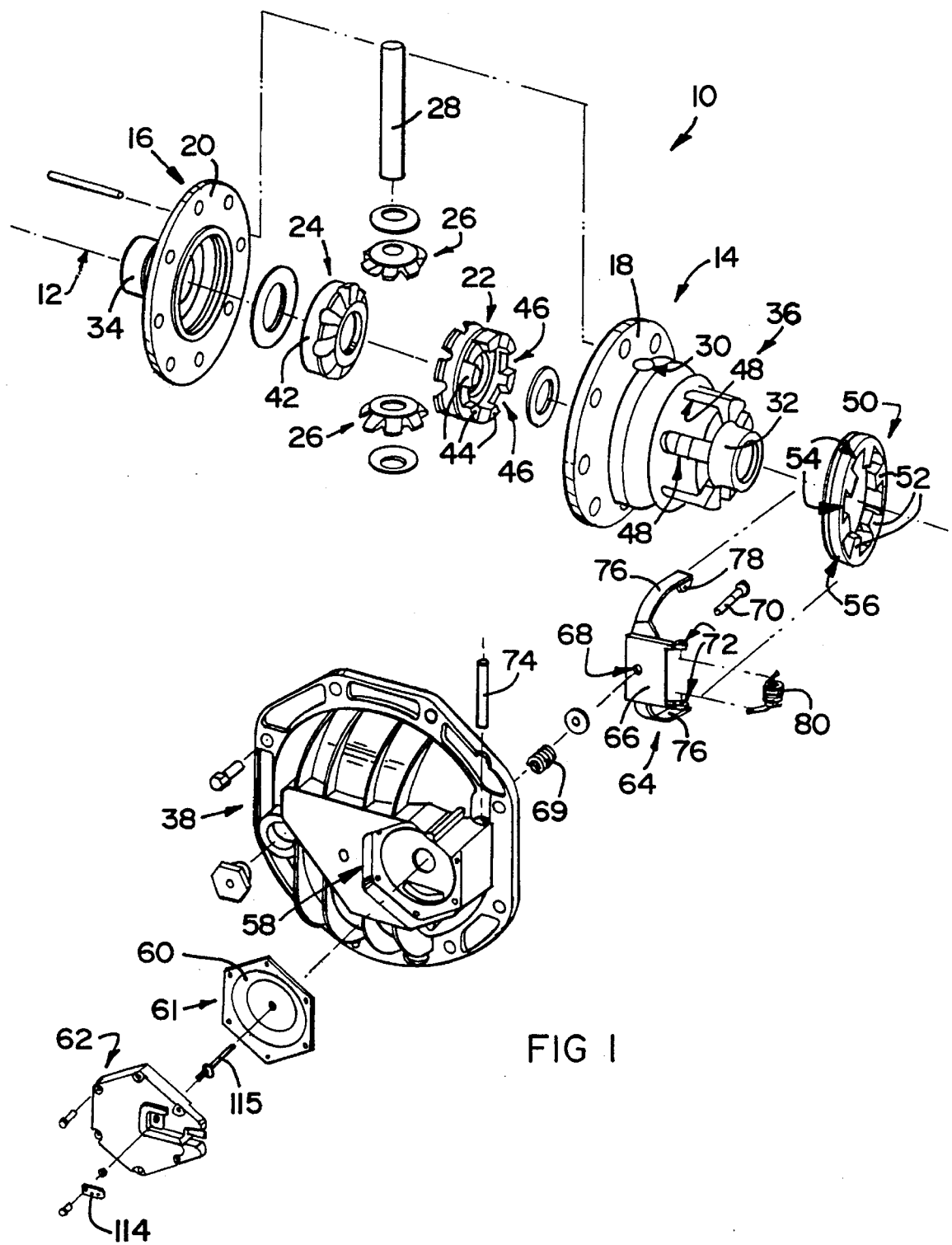
FIG. 1 shows, in three-dimensional exploded view, components forming part of a drive axle incorporating a differential gear in accordance with the invention.

With reference to FIG. 1 of the drawings, some components of a drive axle incorporating a differential gear in accordance with the invention are generally indicated by reference numeral 10. The components are shown in three-dimensional exploded view. The components are in use surrounded by a housing in conventional fashion, which housing is not shown in FIG. 1 of the drawings.

The drive axle is operative between a longitudinal propeller shaft (not shown), and a pair of half shafts (not shown) carrying drive wheels (not shown) at their outer ends. The half shafts are arranged on a transverse shaft centre line 12. The drive axle includes a differential gear train which is received within a dish generally indicated by reference numeral 14 and a cover 16 covering the dish 14 to render it enclosed. The dish 14 and cover 16 are of generally circular construction and are arranged concentrically about the shaft centre line 12. The dish 14 has a peripheral flange 18 and the cover 16 has a peripheral flange 20. The flanges 18 and 20 are complemental, are closable over each other and can be secured together by means of bolts or studs and nuts via apertures in the respective flanges. In this embodiment, a crown wheel of the drive axle is mounted on the flange 18 utilizing the bolt or stud and nut arrangements mentioned above. Thus, the dish 14 serves effectively as a carrier of the differential gear.

Within the dish 14, there are received opposed bevel gears 22, 24 which are secured respectively to inner ends of the half shafts. In addition, in diametrically spaced arrangement, there are provided two bevel pinions 26 in meshing arrangement with the bevel gears 22, 24 and being mounted for rotation about a spindle 28 received via aligned apertures 30 in the dish 14 perpendicular to the shaft centre line 12.

The dish 14 has a sleeve 32 and the cover 16 has a sleeve 34 which are supported in bearings. The inner ends of the half shafts pass through the sleeves 32 and 34 respectively.

In addition, the dish 14 has a boss 36 surrounding the sleeve 32.

The differential gear comprises a cover 38 which covers the housing (not shown) of the drive axle.

The bevel gears 22, 24 have outwardly extending skirts which can best be perceived from the skirt 42 of the bevel gear 24. The skirt of the bevel gear 22 has been machined to form radial slots 46 which define axially extending cogs 44 between them.

Complementally, the boss 36 has been machined to provide slots 48 which extend radially and axially.

The slots 48 are equal in number and are complemental in shape and arrangement to the slots 46 such that the cogs 44 and slots 46 are arranged concentrically within the boss 36. In use, the bevel gear 22 is mounted for relative rotation within the boss 36 such that the slots 46 and slots 48 can be brought into alignment.

The locking device further comprises a locking member in the form of a locking ring 50 having a rim and cogs 52 extending radially inwardly from the rim. The cogs 52 are complemental in pitch, shape and width to the slots 48 and slots 46 such that, in use, the locking ring 50 can move axially over the boss 36, the cogs 52 extending through the slots 48. When the slots 46 are in alignment with the slots 48, the locking ring 50 can be displaced axially further over the boss 36 towards the flange 18 such that the cogs 52 are received also within the slots 46 thus locking the boss 36 and the bevel gear 22 together to prevent the bevel gear 22 from rotating relative to the dish 14. The internal shape of the locking ring 50 is machined by broaching. The significance of this will be referred to hereinafter.

It is to born in mind that the bevel gear 22 is in meshing arrangement with both the bevel pinions 26 which in turn are in meshing arrangement with the bevel gear 24. Thus, when the bevel gear 22 is locked to the dish 14 which again carries the crown wheel, the crown wheel, dish 14, bevel pinions 26 and bevel gears 22, 24 all have to rotate in unison about the centre line 12, it being understood that the bevel pinions 26 orbit about the centre line 12 and that they do not rotate about their own axes. It has further to be borne in mind that the half shafts and the drive wheels are secured to the bevel gears 22, 24 such that, in the locked condition described above, also the half shafts and drive wheels rotate in unison with the crown wheel. The differential gear is then in locked condition.

The cover 38 has formed therein a socket 58. The socket 58 receives a dished diaphragm assembly 61 and a lid 62, covering the diaphragm assembly 61 such that a pressure chamber, in this embodiment range specifically a vacuum chamber is formed within the socket 58 between a diaphragm 60 of the diaphragm assembly 61 and the cover 62.

Internally of the cover 38, there is provided a yoke 64 having a base 66. An elongate link in the form of a headed pin 70 extends in use through an aperture 68 in the base 66 to be screw threadingly secured to the diaphragm 60 as will be described with reference to FIG. 3. The head of the pin 70 is rounded and pivotally received within the aperture 68 such that the yoke 64 can pivot relative to the pin 70. The yoke 64 is pivoted, via apertures 72 provided at ends of lugs extending from the base 66, and a spindle 74, to the cover 38 about an upright axis offset to one side from the pin 70. The yoke 64 further has a pair of arms 76 extending calliper fashion from the base 66. At free ends of the arms 76, they have inwardly directed protuberances 78 which are received in diametrically opposed positions within a peripheral groove 56 extending around the rim of the locking ring 50.

In use, as will be described in more detail hereinafter, the vacuum chamber at the external side of the diaphragm 60 can selectively be communicated with a vacuum sink, such as an inlet manifold of an engine of a vehicle. The internal side of the diaphragm is at the pressure prevailing within the housing of the differential gear, i.e. substantially atmospheric pressure. Thus, when the vacuum chamber is evacuated, the ambient pressure will move the diaphragm 60 toward, or into the pressure chamber. Such movement is transmitted via the pin 70 to the base 66 which causes the yoke 64 to pivot about the spindle 74. This, in turn, causes the free ends of the arms 76 and therewith the protuberances 78 to move sidewardly. Such action displaces the locking ring 50 sidewardly (or axially along the transverse shaft centre line 12) to lock the bevel gear 22 to the dish 14 as described above, and thus to lock the differential gear.

It is to be appreciated that the diaphragm 60, by its very nature, will be impervious. Furthermore, the diaphragm assembly 61 is secured in leak tight manner to the cover 38. Thus, in use, the diaphragm 60 and diaphragm assembly 61 form a seal in the cover 38 sealing an internal cavity, within the housing (not shown) and which is filled with lubricant, from atmosphere.

The yoke 64 is biassed by means of a torsion spring 80 away from the cover 38 into a condition which will displace the locking ring 50 away from the flange 18 and thus away from its engaged position, i.e. to the disengaged position corresponding to an unlocked condition of the differential gear.

Figure 2:
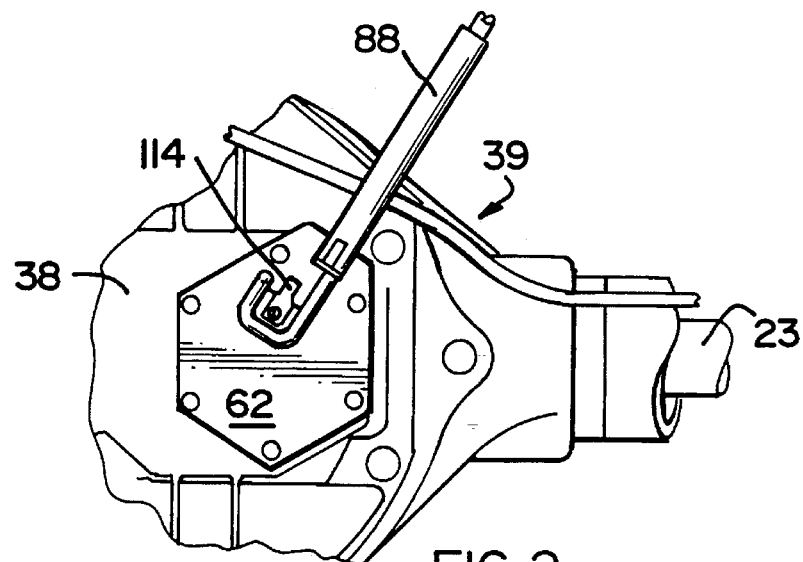
FIG. 2 shows, in fragmentary rear view, a drive axle similar to, but not identical to, the drive axle of FIG. 1.

With reference to FIG. 2, the housing of the differential gear is generally indicated by reference numeral 39. A side shaft 23 which is connected to the bevel gear 22 extends from the housing 39. The cover 38 is shown screwed to the housing 39 with the lid 62 in place on the cover 38. A conduit in the form of a vacuum hose 88 and an electrical terminal 114 which will be described hereinafter are shown in position on the lid 62.

Figure 3:
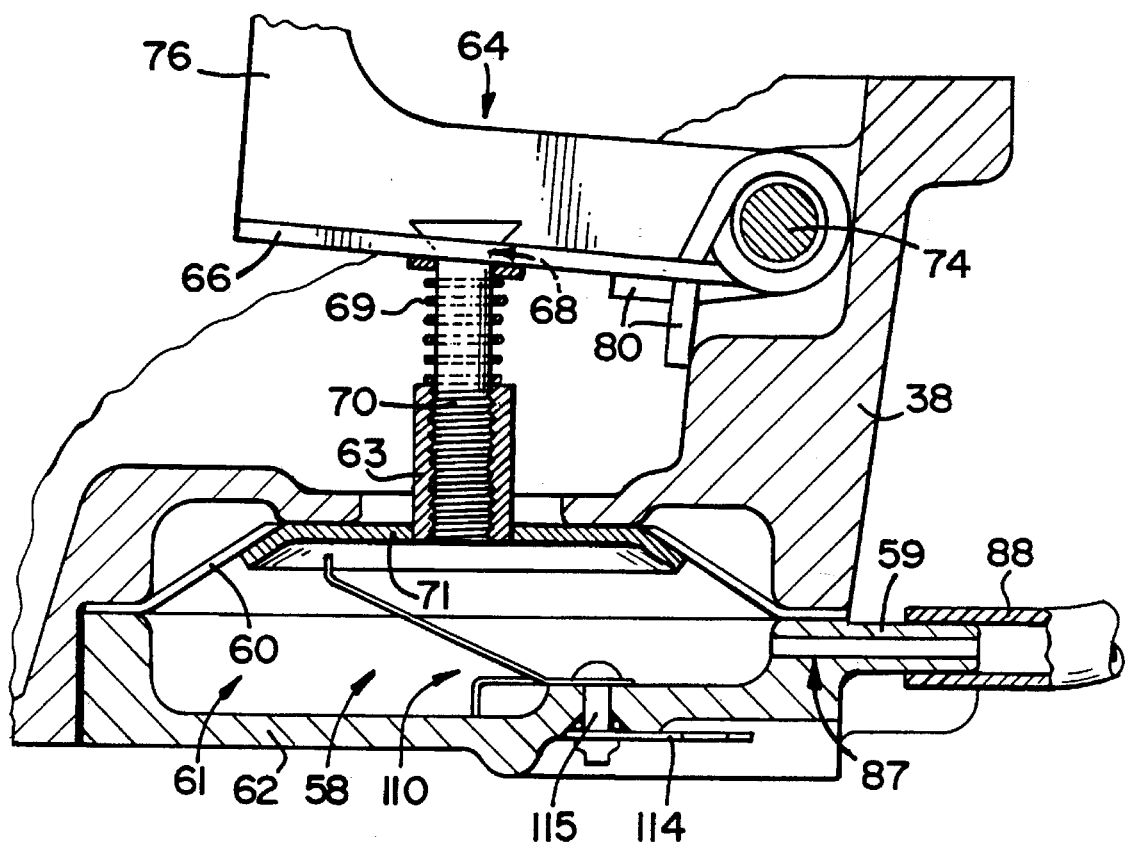
FIG. 3 shows, to a larger scale, in fragmentary sectional plan view, operation of displacement means of the drive axle of FIG. 1.

With reference to FIG. 3, mounting of the diaphragm assembly 61 within the cover 38 and as covered by the lid 62 is shown in more detail. It is shown that the diaphragm assembly 61 has an axially extending female screw threaded sleeve 63 (adapted to be selflocking) by means of which a screw threaded end of the pin 70 is connected to the diaphragm assembly 61. A coil spring 69 operates under compression to bias the diaphragm assembly 61 (via an end of the sleeve 63) and the yoke 64 (via a washer) away from each other.

An internal passage 87 is formed through the lid 62 and terminates in a nipple 59 by means of which the vacuum hose 88 is communicated with the vacuum chamber 58. This aspect will be described in more detail with reference to FIG. 4.

A spring switch 110 is mounted within the vacuum chamber 58 by means of a sealed pop rivet 115 fixing it to the lid 62. The lid 62 is electrically non-conductive or fixing of the switch to the lid is in electrically insulated fashion. The electrical terminal 114 is connected to the switch 110. This aspect will be described in more detail with reference to FIG. 5.

Figure 4:
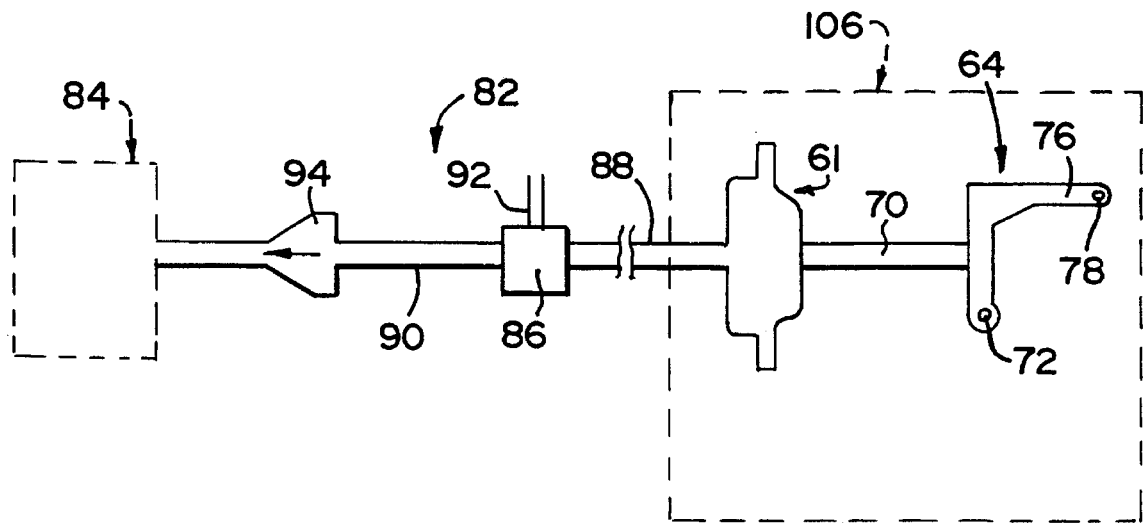
FIG. 4 shows, schematically, operation of a differential gear locking means forming part of the drive axle of FIG. 1.

With reference to FIG. 4, communication means generally indicated by reference numeral 82 is provided selectively to evacuate the vacuum chamber 58 adjacent the diaphragm assembly 61 described above. The diaphragm assembly 61 is schematically shown within the cavity of the drive axle demarcated schematically at 106. The communication means 82 communicates the vacuum chamber with a vacuum sink schematically indicated by reference numeral 84. The communicating means 82 comprises the vacuum hose 88 leading to a control valve 86, and a further hose 90 leading from the control valve via a one way valve 94 to the vacuum sink 84. The control valve 86 has a vent hose 92 open to atmosphere.

In use, when the control valve 86 is in its closed or non-activated condition, communication between the hoses 88 and 90 is interrupted and the hose 88 is connected to the vent hose 92. Thus, in that condition, the vacuum chamber is under atmospheric pressure, there is substantially no differential pressure over the diaphragm 60 and the yoke 64 is biassed by means of the spring 80 to its disengaged condition. Likewise, the locking ring 50 is in its disengaged condition and the differential gear train operates in conventional, i.e. unlocked or free, fashion.

To lock the differential gear train, the control valve 86 is actuated to close communication between the hose 88 and the vent hose 92 and to establish communication between the hose 88 and the hose 90 thus allowing the vacuum sink to evacuate the vacuum chamber. This causes a differential pressure over the diaphragm 60 urging it toward or into the vacuum chamber 58 to pivot the yoke 64 and to cause locking by means of the locking ring 50 between the dish 14 and the bevel gear 22.

Figure 5:
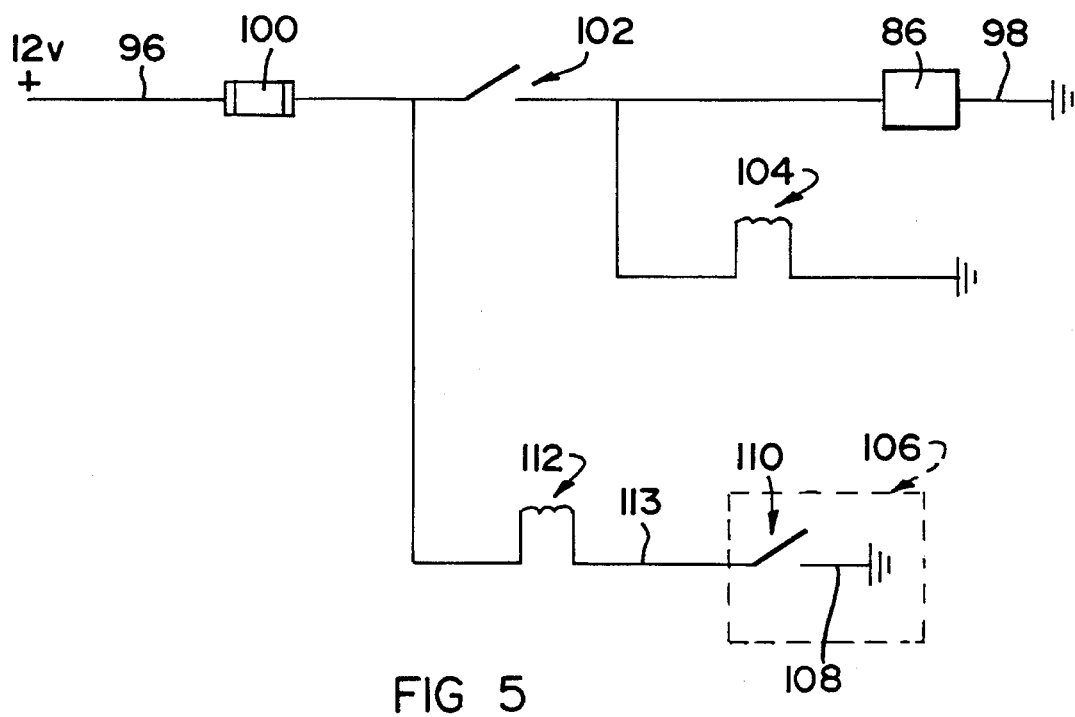
FIG. 5 shows, schematically, a simplified electrical circuit of control means for the differential gear locking means of FIG. 4.

With reference to FIG. 5, control of the control valve 86 is electric. An electrical conductor 96 is connected to a positive terminal of an electrical system of the vehicle within which the drive axle is provided. A further conductor 98, which is earthed, is connected via the control valve 86 and a switch 102 to the conductor 96. A fuse 100 is provided to protect the electrical control system.

The switch 102 can selectively be switched electrically to connect the conductors 96 and 98 thus energising a solenoid of the control valve 86 to actuate the control valve. In parallel with the solenoid, there is provided a confirmation light 104 arranged to confirm to an operator of the vehicle that the locking device is being energised.

In parallel with the switch 102, solenoid and confirmation light 104, there are provided an indicator 112 and the switch 110 arranged within the drive axle 106.

The switch 110 is in the form of the spring switch briefly described with reference to FIG. 3. It is connected via the terminal 114 shown in FIGS. 1 and 3 and via a conductor 113 to the positive conductor 96. The spring switch 110 is arranged, only when the diaphragm 60 has moved inwardly under the differential pressure, to contact a base plate 71 mounting the sleeve 63. The plate 71 is of a conductive material. An earth conductor 108 shown in FIG. 5 is established via the plate 71, sleeve 63 and pin 70, the yoke 64 and the components of the drive axle, with a chassis of the vehicle. Thus, the indicator 112 is energised only when the earth path has been established which can take place only when actual locking has taken place.

In this regard, it is to be appreciated that the lid 62 is of a non-conductive material allowing mounting of the spring switch 110 without earthing it.

The Applicant believes that the specific designs of the locking ring 50 allows the slots 54 to be formed by broaching, which is a relatively inexpensive method of machining compared to milling.

It is further an advantage that actuating the locking means is effected electrically, and that energising or driving the locking means is effected pneumatically, more specifically by establishing under pressure or vacuum at one side of a diaphragm.

It is yet a further advantage that a driver of the vehicle can establish (by means of the confirmation light 104) when the locking device has been energised, and, important, can establish by means of the indicator 112 that the locking means has actually locked the differential gear once slots 46 become circumferentially aligned with cogs 52 thus allowing the locking ring 50 to be displaced by the displacement means.

For purposes of explaining the invention by way of example, a differential gear train forming part of a drive axle was described. It is to be borne in mind that the invention can be applied also to an inter axle differential gear train such as is used in certain vehicles having more than one drive axle. That application is thus also included in this invention.

I claim:

1. A combination comprising a differential gear and locking means for selectively locking differential operation of the differential gear, the differential gear comprising:

a cogged crown wheel, which is arranged for rotation about a transverse crown wheel axis, and which is adapted to mesh with a complemental pinion at an end of a drive shaft transmitting drive from an engine to the differential gear;

a carrier which is fixed to the crown wheel to be rotatable therewith and which contains a differential gear train which includes at least one bevel pinion mounted on the carrier on a pinion shaft defining a bevel pinion axis perpendicular to the crown wheel axis, such that the bevel pinion can orbit about the crown wheel axis and can rotate about the bevel pinion axis;

a pair of bevel gears at inner ends of half shafts, the bevel gears being in rotatable opposed arrangement about the crown wheel axis and being respectively in meshing arrangement with said at least one bevel pinion;

a housing having an internal chamber enclosing the carrier and said pair of bevel gears, the housing having in a wall thereof an aperture exposed to said internal chamber; and a cover covering said aperture, the locking means comprising:

a locking member which is displaceable within said internal chamber between an engaged position in which the locking member interlocks predetermined rotation components of the differential gear and a disengaged position in which the locking member releases at least one of said predetermined rotation components and in which said predetermined rotation components are free for relative rotation;

displacement means for selectively displacing the locking member between said engaged and disengaged positions, the displacement means including a diaphragm arranged to generate motion when subjected to differential pressure, and transmission means arranged substantially within said internal chamber and connected between the diaphragm and the locking member for operatively transmitting said motion of the diaphragm to the locking member, said cover covering the aperture in the housing having a socket in a wall thereof and a lid covering the socket, said diaphragm being mounted in said socket internally of the lid such that a first side of the diaphragm faces the lid and defines a pressure chamber between the first side of the diaphragm and the lid and a second side of the diaphragm, opposed to said first side, is exposed to said internal chamber, the diaphragm forming a seal for sealing said internal chamber, said pressure chamber having a port which is connected to a conduit and a valve which is adapted, selectively, to place the pressure chamber into communication with ambient atmosphere via said conduit and with a source of a pressure different from ambient pressure.

2. A combination as claimed in claim 1 in which said source of pressure different from ambient pressure is a source of vacuum, the arrangement being such that the displacement means displaces the locking member to the engaged position when the pressure chamber is communicated with the source of vacuum, the displacement means including resilient bias means resiliently biassing the locking member to the disengaged position automatically to displace the locking member to the disengaged position if the pressure chamber is placed into communication with ambient pressure.

3. A combination as claimed in claim 1 in which said predetermined rotation components respectively include one bevel gear of said pair of bevel gears and said carrier, said one bevel gear including integral cogs and said carrier including integral cogs complemental to and alignable with the integral cogs of said one bevel gear, the locking ring having cogs complemental to and meshingly engageable with the cogs of said one bevel gear and the carrier.

4. A combination as claimed in claim 3 in which said integral cogs of the carrier are arranged to be concentric to and radially outside the integral cogs of said one bevel gear and the respective cogs of said one bevel gear and the carrier are arranged to be alignable, and, when aligned, to be disposed laterally for engagement by the cogs of the locking ring.

5. A combination as claimed in claim 4 in which said integral cogs of the carrier are longer in an axial direction than said integral cogs of said one bevel gear, the arrangement being such that first portions of said integral cogs of the carrier are concentrically overlapping said cogs of said one bevel gear and such that elongate portions of said integral cogs of the carrier are axially spaced from said integral cogs of said one bevel gear, the locking ring being meshingly engaged with said elongate portions of said integral cogs of the carrier and released from said integral cogs of said one bevel gear when said locking ring is in said disengaged position, the locking ring being meshingly engaged both with said first portions of said integral cogs of the carrier and said integral cogs of the bevel gear to interlock the carrier and the bevel gear when said locking ring is in said engaged position.

6. A combination as claimed in claim 4 in which the diaphragm is arranged for movement along a diaphragm axis transverse to a bevel gear axis of said one bevel gear, and in which the displacement means includes a yoke which is pivoted about a pivot axis transverse to and spaced from both the diaphragm axis and the bevel gear axis, the displacement means including a connection between the diaphragm and the yoke and a connection between the yoke and the locking ring such that translation of the diaphragm along the diaphragm axis pivots the yoke and causes corresponding motion of the locking ring along the bevel gear axis.

7. A combination as claimed in claim 1 in which said diaphragm forms part of a diaphragm assembly including an electrically conductive component which is electrically connected to the housing, said combination further including a resilient, electrically conductive member mounted on said lid in electrically insulated fashion and arranged to touch said electrically conductive component of the diaphragm assembly only when the diaphragm is substantially in the engaged position, and an electrical indicating circuit including an indicator, said electrically conductive component of the diaphragm assembly and said resilient, electrically conductive member being in series in the indicating circuit, the arrangement being such that the indicator is actuated or energized only when the circuit is closed by said resilient, electrically conductive member touching said electrically conductive component.

\* \* \* \* \*